United States Patent
Ma

(10) Patent No.: US 9,403,986 B2
(45) Date of Patent: Aug. 2, 2016

(54) GRAFT COPOLYMER PIGMENT DISPERSANT

(75) Inventor: Sheau-Hwa Ma, West Chester, PA (US)

(73) Assignee: AXALTA COATING SYSTEMS IP CO., LLC, Wilmington, DE (US)

( * ) Notice: Subject to any disclaimer, the term of this patent is extended or adjusted under 35 U.S.C. 154(b) by 1199 days.

(21) Appl. No.: 13/377,842

(22) PCT Filed: Jun. 28, 2010

(86) PCT No.: PCT/US2010/040164
§ 371 (c)(1),
(2), (4) Date: Dec. 13, 2011

(87) PCT Pub. No.: WO2010/151865
PCT Pub. Date: Dec. 29, 2010

(65) Prior Publication Data
US 2012/0083552 A1  Apr. 5, 2012

Related U.S. Application Data

(60) Provisional application No. 61/220,668, filed on Jun. 26, 2009.

(51) Int. Cl.
| | | |
|---|---|---|
| C09D 151/06 | (2006.01) | |
| C09B 67/20 | (2006.01) | |
| C08F 290/04 | (2006.01) | |
| C09C 3/10 | (2006.01) | |
| C09D 7/02 | (2006.01) | |
| C09D 17/00 | (2006.01) | |
| C09D 151/00 | (2006.01) | |

(52) U.S. Cl.
CPC ......... *C09B 67/0063* (2013.01); *C08F 290/046* (2013.01); *C09C 3/10* (2013.01); *C09D 7/02* (2013.01); *C09D 17/002* (2013.01); *C09D 151/003* (2013.01); *C01P 2006/22* (2013.01)

(58) Field of Classification Search
USPC ....................................................... 525/500
See application file for complete search history.

(56) References Cited

U.S. PATENT DOCUMENTS

| | | | |
|---|---|---|---|
| 4,680,352 A | 7/1987 | Janowicz et al. | |
| 4,722,984 A | 2/1988 | Janowicz | |
| 6,362,274 B1 | 3/2002 | Legrand et al. | |
| 2002/0137865 A1 | 9/2002 | Haubennestel et al. | |
| 2007/0149436 A1* | 6/2007 | Boeckh ................. | C08F 220/28 510/475 |

FOREIGN PATENT DOCUMENTS

WO  2008103356 A1  8/2008

OTHER PUBLICATIONS

SIPO, Chinese Notice of Allowance, issued in Application No. 201080028802.3, dated Feb. 8, 2014.
International Searching Authority, International Search Report and Written Opinion for International Application No. PCT/US2010/040164, mailed Sep. 16, 2010.
The International Bureau of WIPO, International Preliminary Report on Patentability for International Application No. PCT/US2010/040164, mailed Jan. 12, 2012.
European Patent Office, Communication pursuant to Article 94(3) EPC for Application No. 10 730 313.3, mailed Jun. 17, 2013.
State Intellectual Property Office of the P.R.C., First Office Action for Chinese Patent Application No. 201080028802.3, mailed Jan. 18, 2013.
State Intellectual Property Office of the P.R.C., Text of the First Office Action for Chinese Patent Application No. 201080028802.3, mailed Jan. 18, 2013.
State Intellectual Property Office of the P.R.C., Search Report for Chinese Patent Application No. 201080028802.3, mailed Jan. 18, 2013.
State Intellectual Property Office of the P.R.C., Second Office Action for Chinese Patent Application No. 201080028802.3, mailed Jul. 24, 2013.
EPO, European Examination Report issued in Application No. 10730313.3, dated May 7, 2015.

* cited by examiner

*Primary Examiner* — Ling Choi
*Assistant Examiner* — Thuy-Ai Nguyen
(74) *Attorney, Agent, or Firm* — Ingrassia Fisher & Lorenz, P.C.

(57) ABSTRACT

A pigment dispersant comprising a graft copolymer is described. The graft copolymer comprises a backbone having polymerized vinyl imidazole groups and side chains from macromonomers. The vinyl imidazole comprises 2 percent to 20 percent by weight of the graft copolymer and the macromonomer comprises 55 percent to 85 percent by weight of the graft copolymer. The pigment dispersant is useful for forming pigment dispersions that can be used in solvent borne coating compositions.

15 Claims, No Drawings

GRAFT COPOLYMER PIGMENT DISPERSANT

CROSS-REFERENCE TO RELATED APPLICATION

This application claims priority from U.S. Provisional Application Ser. Nos. 61/220,668; 61/220,672; 61/220,675; and 61/220,681 (filed Jun. 26, 2009), the disclosure of each is incorporated by reference herein for all purposes as if fully set forth.

FIELD OF THE DISCLOSURE

The present disclosure is directed to a graft copolymer that is capable of dispersing a wide variety of organic and inorganic pigments to form a pigment dispersion. The pigment dispersion is especially useful to form a solvent borne pigmented coating composition.

BACKGROUND OF THE DISCLOSURE

Polymeric materials are known which are effective for dispersing pigments in organic solvents and used to form pigment dispersions of uniform color that are useful in formulating water borne and solvent borne coating compositions. Such pigment dispersions are widely used, for example, in exterior coating for automobiles and trucks.

Much of the past activity concerning pigment dispersants has been with random copolymers, but such relatively inefficient materials are now being replaced by structured pigment dispersants, such as those described in US 2002/0137865 to BYK-Chemie GmbH. Graft copolymers are generally composed of a macromonomer grafted onto a polymer backbone and have attached to either the macromonomer, the backbone or both, one or more groups known as pigment anchoring groups which are designed to adsorb on the surface of a pigment particle and thereby anchor the polymer to the pigment surface.

While the past work indicates that graft copolymers are outstanding dispersants, the graft copolymers containing certain pigment anchoring groups can also suffer from certain significant drawbacks. For instance, the pigment anchoring groups may not selectively adsorb certain pigment types and/or can be displaced from pigment surfaces by polar solvents or other polar groups present in a coating composition. Ineffective anchoring of the dispersant to a pigment particle surface is highly undesired, since it can allow the pigment particles to flocculate, or cluster together, and can result, ultimately, in coatings of poor color quality.

Therefore, there is still a need to improve the performance of pigment dispersants, and in particular to find new graft copolymers that are more effective in dispersing a wide range of pigments, especially in coating compositions.

SUMMARY OF THE DISCLOSURE

The present disclosure relates to a pigment dispersant comprising a graft copolymer having a polymeric backbone and side chains attached to the backbone, wherein the graft copolymer is formed from a monomer mixture comprising;
 a) in the range of from 2 percent to 20 percent by weight of vinylimidazole monomer; and
 b) in the range of from 55 percent to 85 percent by weight of a macromonomer; and wherein the macromonomer comprises polymerized ethylenically unsaturated monomers, and the percentages by weight are based on the total weight of the graft copolymer.

The present disclosure further relates to a pigment dispersion comprising the pigment dispersant and to a coating composition comprising the pigment dispersant.

DETAILED DESCRIPTION

The features and advantages of the present disclosure will be more readily understood, by those of ordinary skill in the art, from reading the following detailed description. It is to be appreciated that certain features of the disclosure, which are, for clarity, described in the context of separate embodiments, may also be provided in combination in a single embodiment. Conversely, various features of the disclosure that are, for brevity, described in the context of a single embodiment, may also be provided separately or in any sub-combination.

Also, the use of "a" or "an" are employed to describe elements and components described herein. This is done merely for convenience and to give a general sense of the scope of the disclosure. This description should be read to include one or at least one and the singular also includes the plural unless the context specifically states otherwise.

The use of numerical values in the various ranges specified in this application, unless expressly indicated otherwise, are stated as approximations as though the minimum and maximum values within the stated ranges were both preceded by the word "about". In this manner, slight variations above and below the stated ranges can be used to achieve substantially the same results as values within the ranges. Also, the disclosure of these ranges is intended as a continuous range including every value between the minimum and maximum values.

As used herein, "$M_w$" means weight average molecular weight and "$M_n$" means number average molecular weight. The units for any of the stated values or ranges is in daltons. The molecular weights are determined by gel permeation chromatography (GPC) using a polystyrene standard.

The term "macromonomer" means a polymer having at least two repeat units and having an ethylenically unsaturated group that can be polymerized via free radical polymerization techniques. In some embodiments, the ethylenically unsaturated group can be a terminal ethylenically unsaturated group. Suitable macromonomers can have, in some embodiments, a $M_w$ in the range of about 1,000 to 50,000. In other embodiments, the $M_w$ of the macromonomer can be in the range of from 1,000 to 40,000, and, in other embodiments, the $M_w$ of the macromonomer can be in the range of from 1,000 to 30,000. Upon polymerization of the macromonomer with other ethylenically unsaturated monomers, the ethylenically unsaturated portion of the macromonomer becomes a part of the backbone of the graft polymer, and the remainder of the macromonomer forms the side chain of the graft copolymer.

The pigment dispersant can comprise a graft copolymer having a polymeric backbone and side chains attached to the backbone at a single terminal point. In some embodiments, the graft copolymer can be formed from the polymerization of a monomer mixture comprising a) vinyl imidazole, b) macromonomer and optionally c) additional ethylenically unsaturated monomers. In some embodiments, the vinyl imidazole monomer can comprise in the range of from 2 percent to 20 percent by weight of the graft copolymer. In other embodiments, the vinyl imidazole monomer can comprise in the range of from 2 percent to 15 percent by weight of the graft copolymer, and in other embodiments the vinyl imidazole monomer can comprise in the range of from 3 percent to 12 percent by weight of the graft copolymer. As used here, all percentages by weight are based on the total weight of the graft copolymer.

The present disclosure uses the commercially available N-vinyl imidazole. It is expected that any of the other isomers of vinyl imidazole would function in a similar manner.

The macromonomer comprises or consists essentially of polymerized ethylenically unsaturated monomers. In some embodiments, the macromonomer can comprise in the range of from 55 percent to 85 percent by weight of the graft copolymer. In other embodiments, the macromonomer can comprise in the range of from 60 percent to 80 percent by weight of the graft copolymer. In other embodiments, the macromonomer can comprise in the range of from 65 percent to 78 percent by weight of the graft copolymer. In still further embodiments, the macromonomer can comprise in the range of from 67 percent to 77 percent by weight of the graft copolymer. As used here, all percentages by weight are based on the total weight of the graft copolymer.

Methods are known for forming the macromonomers. Some of the known methods can include, for example, group transfer polymerization, reversible addition-fragmentation chain transfer, atom transfer radical polymerization, and end group modification procedures. In some embodiments, the methods can form a macromonomer having one terminal ethylenically unsaturated group that can polymerize with the monomer mixture comprising vinyl imidazole to form a graft copolymer having a side chain that is attached to the backbone at a single terminal point.

In some embodiments, the macromonomers can be prepared by a free radical polymerization method, wherein the macromonomer is polymerized in the presence of a catalytic cobalt chain transfer agent containing a $Co^{2+}$ group, a $Co^{3+}$ group, or both. In some embodiments, the macromonomer can be prepared by polymerizing the ethylenically unsaturated monomers, in particular methacrylate based monomers, in the presence of a cobalt chain transfer agent. The macromonomer polymerization can be carried out in an organic solvent or solvent blend using polymerization initiators, such as, for example, azo or peroxy initiators.

Examples of cobalt chain transfer agents that can be used to form the macromonomer are described in U.S. Pat. Nos. 4,680,352 and 4,722,984 to Janowicz. Suitable cobalt chain transfer agents are, for example, pentacyano cobaltate (II), diaquabis(borondiflurodimethylglyoximato) cobaltate (II), and diaquabis(borondifluorophenylglyoximato) cobaltate (II). Typically, these chain transfer agents can be used at concentrations of about 2-5000 parts per million based upon the particular monomers being polymerized and the desired molecular weight.

Any of the commonly used azo or peroxy polymerization initiators can be used for preparation of the macromonomer provided it has solubility in the solvents and the monomer mixture, and has an appropriate half life at the temperature of polymerization. "Appropriate half life" as used herein is a half life of about 10 minutes to 4 hours. Suitable azo initiators can include, for example, 2,2'-azobis (isobutyronitrile), 2,2'-azobis (2,4-dimethylvaleronitrile), 2,2'-azobis (methylbutyronitrile), and 1,1'-azobis (cyanocyclohexane). Examples of peroxy based initiators can include, for example, benzoyl peroxide, lauroyl peroxide, t-butyl peroxypivalate and t-butyl peroctoate, which can be used provided they do not adversely react with the chain transfer agents under the reaction conditions for macromonomers.

The macromonomer can contain a single terminal ethylenically unsaturated group, and primarily contains polymerized acrylate monomers, methacrylate monomers, vinyl monomers or a combination thereof. Suitable monomers can include, for example, acrylic acid, methacrylic acid, alkyl methacrylates, cycloaliphatic methacrylates, aryl methacrylates, alkyl acrylates, cycloaliphatic acrylates and aryl acrylates. Suitable alkyl acrylates and methacrylates can include, for example, methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, ethoxytriethyleneglycol methacrylate, methyl acrylate, ethyl acrylate, propyl acrylate, isopropyl acrylate, n-butyl acrylate, isobutyl acrylate, t-butyl acrylate, 2-ethyl hexyl acrylate, nonyl acrylate, lauryl acrylate, stearyl acrylate and ethoxytriethyleneglycol acrylate. Cycloaliphatic acrylates and methacrylates can include, for example, trimethylcyclohexyl methacrylate, t-butyl cyclohexyl methacrylate, cyclohexyl methacrylate, isobornyl methacrylate, cyclohexyl acrylate, trimethylcyclohexyl acrylate, isobornyl acrylate and t-butyl cyclohexyl acrylate. Aryl methacrylates and acrylates can include, for example, benzyl methacrylate, phenyl methacrylate, benzyl acrylate and phenyl acrylate. Vinyl monomers such as styrene, t-butyl styrene and vinyl toluene, can also be used. Combinations of any of the acrylate, methacrylate or vinyl monomers can also be used.

It should be noted that if acid functional monomers, such as, for example, acrylic acid and/or methacrylic acid are used, their concentration should be kept relatively low, less than 0.5 percent by weight based on the total weight of all of the monomers of the graft copolymer, so that they do not form acid salts with the imidazole or any other amine functional monomers that could lead to undesired polymer-polymer interactions. Acid functional monomers, in addition to the potential for forming salts, can also increase the hydrophilicity of the graft copolymer. Increasing the hydrophilicity can increase the sensitivity of a cured coating composition to the effects of water and lead to the possibility of forming defects in the coating. In some embodiments, the graft copolymer is free from the acid functional monomers.

In some embodiments, the macromonomer is free from functional groups such as, for example, amide, amine, quaternary ammonium or hydroxyl functional groups. In other embodiments, the functional groups present on the macromonomer can comprise or can consist essentially of hydroxyl functional groups.

Typical solvents that can be used to form the macromonomer are alcohols, such as, for example, methanol, ethanol, n-propanol, and isopropanol; ketones, such as, for example, acetone, butanone, pentanone, hexanone, and methyl ethyl ketone; alkyl esters of acetic, propionic, and butyric acids, such as, for example, ethyl acetate, butyl acetate, and amyl acetate; ethers, such as, for example, tetrahydrofuran, diethyl ether; and ethylene glycol and polyethylene glycol monoalkyl and dialkyl ethers such as cellosolves and carbitols; and, glycols such as ethylene glycol and propylene glycol or a combination thereof.

The monomer mixture used to form the graft copolymer comprises vinyl imidazole and can optionally comprise additional ethylenically unsaturated monomers. In some embodiments, the additional monomers can include monomers having functional groups; monomers that are free from functional groups; or a combination thereof. The functional groups on the monomers can be selected from the group consisting of acyclic amide, cyclic amide, amine, quaternary ammonium, hydroxyl functional groups and a combination thereof. As used herein, the phrase "monomers free from functional groups" means ethylenically polymerizable monomers that are free from functional groups that are capable of condensation polymerization reactions, with the proviso that ester functional groups can be present.

Amide functional monomers can be incorporated as part of the backbone monomers by the polymerization of appropriate ethylenically unsaturated amide functional monomers. Typically useful acrylamide and methacrylamide monomers can be represented by formula (1):

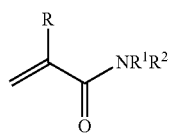
(1)

wherein R is H or $CH_3$; $R^1$ and $R^2$ are each independently selected from the group consisting of hydrogen; alkyl groups having 1 to 20 carbon atoms; cycloalkyl groups having 3 to 20 carbon atoms; aryl, arylalkyl, and alkylaryl having 6 to 20 carbon atoms; and $R^1$ and $R^2$ can join together to form a ring. Optionally each $R^1$ and $R^2$ can contain one or more substituents selected from the groups consisting of hydroxyl, amino, ester, acid, acyloxy, amide, nitrile, halogen, alkoxy and a combination thereof. Useful examples can include, for example, N-methylmethacrylamide, N-ethylmethacrylamide, N-octylmethacrylamide, N-dodecylmethacrylamide, N-(isobutoxymethyl) methacrylamide, N-phenylmethacrylamide, N-benzylmethacrylamide, N,N-dimethylmethacrylamide, N-methyl acrylamide, N-ethylacrylamide, N-t-butylacrylamide, N-(isobutoxymethyl) acrylamide, N,N-dimethylacrylamide, N,N-diethylacrylamide, N,N-dibutyl acrylamide, or a combination thereof.

Other amide functional monomers can include ethylenically unsaturated monomers containing a cyclic amide group. Examples of ethylenically unsaturated monomers having a cyclic amide group can be represented by formulas (2) and (3);

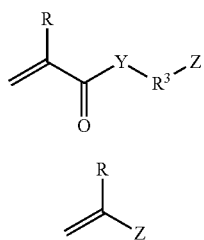
(2)

(3)

wherein R is H or $CH_3$; Y is O or $NR^4$; $R^3$ is selected from the group consisting of alkyl groups having 1 to 20 carbon atoms; cycloalkyl groups having 3 to 20 carbon atoms; aryl, arylalkyl, and alkylaryl having 6 to 20 carbon atoms; and can optionally contain substituents selected from the group consisting of hydroxyl, amino, ester, acid, acyloxy, amide, nitrile, halogen, alkoxy and a combination thereof; $R^4$ is selected from the group consisting of hydrogen; alkyl groups having 1 to 20 carbon atoms; cycloalkyl groups having 3 to 20 carbon atoms; aryl, arylalkyl, and alkylaryl having 6 to 20 carbon atoms; and can optionally contain substituents selected from the group consisting of hydroxyl, amino, ester, acid, acyloxy, amide, nitrile, halogen, alkoxy and a combination thereof; and Z represents a direct bond between one of the formulas (2) or (3) with one of the formulas (4) or (5).

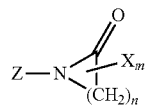
(4)

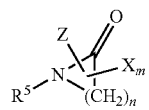
(5)

wherein n=3-7; m=0-3; X is a substituent on the cyclic structure and can be selected from the group consisting of alkyl groups having 1 to 20 carbon atoms; cycloalkyl groups having 3 to 20 carbon atoms; aryl, arylalkyl, and alkylaryl having 6 to 20 carbon atoms; and optionally X can contain substituents selected from the group consisting of hydroxyl, amino, ester, acid, acyloxy, amide, nitrile, halogen, alkoxy and a combination thereof; $R^5$ is selected from the group consisting of hydrogen; alkyl groups having 1 to 20 carbon atoms; cycloalkyl groups having 3 to 20 carbon atoms; aryl, arylalkyl, and alkylaryl having 6 to 20 carbon atoms, and optionally contains substituents selected from the group consisting of hydroxyl, amino, ester, acid, acyloxy, amide, nitrile, halogen, alkoxy and a combination thereof; and Z represents a direct bond between one of the formulas (4) or (5) with one of the formulas (2) or (3).

Optionally, amine functional monomers, other than the vinyl imidazole, can be incorporated as part of the backbone monomers by the polymerization of suitable ethylenically unsaturated monomers which contain amine functional groups. The amine groups can include primary, secondary and tertiary amine functional groups. Suitable amine functional monomers can include, for example, N,N-dimethylaminoethyl acrylate, N,N-dimethylaminoethyl methacrylate, N,N-diethylaminoethyl acrylate, N,N-diethylaminoethyl methacrylate, N-t-butylaminoethyl methacrylate, N-t-butylaminoethyl acrylate, 2-N-morpholinoethyl acrylate, 2-N-morpholinoethyl methacrylate or a combination thereof. Alternatively, the amine functional groups may be obtained by reacting an amine with a monomer or a copolymer containing epoxy groups.

The amine containing functional groups, including the imidazole group and any of the amine functional monomers listed above, optionally can be quaternized to produce a graft copolymer containing quaternary ammonium groups. Quaternary ammonium groups can be produced by contacting a graft copolymer containing amine functional groups with an alkylation agent and/or an organic acid. In some embodiments, up to 10 percent of the amine containing functional groups can be converted to the quaternary ammonium group, and in other embodiments, up to 30 percent of the amine containing functional groups can be converted to the quaternary ammonium group. In further embodiments, up to 100 percent of the amine containing functional groups can be converted to the quaternary ammonium group.

The amine functional groups can be converted to the quaternary ammonium group after the formation of the graft copolymer by contacting the graft copolymer with conventional quaternization agents, such as aralkyl halides, alkyl halides, alkyl aryl sulfonates, organic acids or trialkyl phosphate halides. Suitable quaternization agents which have been found to be satisfactory include, for example, benzyl chloride, methyl toluene sulfonate, and dimethyl sulfate.

Suitable organic acids include, for example, acids containing at least 2 carbon atoms. In some embodiments, the organic acid can contain at least 6 carbon atoms and in further embodiments, the organic acid can contain at least 8 carbon atoms. Such acids include, for example, acetic acid, decanoic acid, caproic acid, lauric acid, myristic acid, palmitic acid, stearic acid or a combination thereof.

Monomers containing hydroxyl functional groups can be used to form the graft copolymer. In some embodiments, hydroxyl functional monomers can be polymerized as part of the monomer mixture and form a part of the backbone. In other embodiments, hydroxyl functional monomers can be polymerized to form a part of the macromonomer and subsequently form a graft copolymer having hydroxyl functional groups on the side chain, and, in further embodiments, hydroxyl functional monomers can be present on both the backbone and the side chains of the graft copolymer. Suitable hydroxyl functional monomers that can be used include, for example, 2-hydroxylethyl methacrylate, 2-hydroxylpropyl methacrylate, 3-hydroxylpropyl methacrylate, 4-hydroxylbutyl methacrylate, 2-hydroxylethyl acrylate, 2-hydroxylpropyl acrylate, 3-hydroxylpropyl acrylate, 4-hydroxylbutyl acrylate and a combination thereof. The hydroxyl functional monomers can be included in a concentration of up to about 30 percent by weight of the graft copolymer.

Monomers that are free from functional groups can be incorporated as a part of the backbone of the graft copolymer. Suitable monomers include, for example, methyl methacrylate, ethyl methacrylate, propyl methacrylate, isopropyl methacrylate, n-butyl methacrylate, isobutyl methacrylate, t-butyl methacrylate, pentyl methacrylate, hexyl methacrylate, 2-ethyl hexyl methacrylate, nonyl methacrylate, lauryl methacrylate, stearyl methacrylate, ethoxytriethyleneglycol methacrylate, methyl acrylate, ethyl acrylate, propyl acrylate, isopropyl acrylate, n-butyl acrylate, isobutyl acrylate, t-butyl acrylate, 2-ethyl hexyl acrylate, nonyl acrylate, lauryl acrylate, 2-(2-ethoxyethoxy)ethyl acrylate, trimethylcyclohexyl methacrylate, t-butyl cyclohexyl methacrylate, cyclohexyl methacrylate, isobornyl methacrylate, cyclohexyl acrylate, trimethylcyclohexyl acrylate, isobornyl acrylate, t-butyl cyclohexyl acrylate, benzyl methacrylate, phenyl methacrylate, benzyl acrylate, 2-phenoxyethyl acrylate, styrene, t-butyl styrene, vinyl toluene and a combination thereof.

As was previously stated, the graft copolymer can be produced from a monomer mixture comprising in the range of from a) 2 percent to 20 percent by weight vinyl imidazole, b) 55 percent to 85 percent by weight macromonomer and optionally, the monomer mixture can comprise c) additional monomers. In some embodiments, the additional monomers comprise greater than 50 percent by weight of acrylate monomers. In other embodiments, the additional monomers comprise greater than 75 percent by weight of acrylate monomers, and in still other embodiments, the additional monomers consists essentially of acrylate monomers. The percentages by weight for the additional monomers are based on the total weight of the additional monomers.

To form the desired graft copolymer by free radical polymerization, the monomer mixture comprising a) vinyl imidazole; b) macromonomer and, optionally c) additional monomers can be combined along with optional solvent and polymerization initiator. The monomer mixture can be copolymerized using any of the azo or peroxy initiators and organic solvents previously described. The polymerization can be carried out at a range of temperatures from below the reflux temperature of the solvent to above the reflux temperature of the solvent (if the reaction vessel is pressurized), until a graft copolymer is formed of desired molecular weight. The disclosed graft copolymer can have a $M_w$, in some embodiments, in the range of about 5,000 to 100,000, and in other embodiments, the $M_w$ can be in the range of from 8,000 to 50,000.

In a more specific embodiment, the pigment dispersant can be formed from a monomer mixture consisting essentially of vinyl imidazole, macromonomer, amine functional monomers and optionally, additional monomers that are free from functional groups.

In another more specific embodiment, the pigment dispersant can be formed from a monomer mixture consisting essentially of vinyl imidazole, macromonomer, amide functional monomers and optionally, additional monomers that are free from functional groups.

In another more specific embodiment, the pigment dispersant can be formed from a monomer mixture consisting essentially of vinyl imidazole, macromonomer, ammonium functional monomers and optionally, additional monomers that are free from functional groups.

In another more specific embodiment, the pigment dispersant can be formed from a monomer mixture consisting essentially of vinyl imidazole, macromonomer, hydroxyl functional monomers and optionally, additional monomers that are free from functional groups.

Another embodiment of the present disclosure is a pigment dispersion comprising the disclosed graft copolymer, pigments and organic solvents. To form the pigment dispersion, pigments can be added to the disclosed graft copolymer in an organic solvent or blend of organic solvents and can be dispersed using conventional techniques such as, for example, high speed mixing, ball milling, sand grinding, attritor grinding, or two or three roll milling. The resulting pigment dispersion can have a graft copolymer to pigment weight ratio of about 0.1/100 up to 500/100.

The disclosed graft copolymer is capable of dispersing a variety of pigments to form a pigment dispersion. In some embodiments, the pigments can include, for example, inorganic and/or organic pigments. Suitable inorganic pigments include, for example, titanium dioxide, iron oxides of various colors, zinc oxide, carbon black, talc, china clay, barytes, carbonates, silicates and a combination thereof; a wide variety of organic pigments such as, for example, quinacridones, phthalocyanines, perylenes, azo pigments, indanthrones, carbazoles, isoindolinones, isoindolones, thioindigio reds, and benzimidazolinones; and metallic flakes such as aluminum flake, pearlescent flakes, and a combination of any of the previously mentioned pigments.

Pigment dispersions of this disclosure can be added to a variety of solventborne coating compositions such as primers, primer surfacers, basecoats which may be glossy colored topcoats, or basecoats of a basecoat/clearcoat finish. A further embodiment of the disclosure is a solvent borne coating composition comprising the previously described pigment dispersant. In some embodiments, the solvent borne coating composition can comprise lacquers which can dry by solvent evaporation without crosslinking or can have oxidative crosslinking during drying. The film forming polymer used in a lacquer can comprise for example, polyacrylates, polyacrylourethanes, polyester urethanes, polyethers, polyesters or a combination thereof. To enable the oxidative crosslinking for improved film properties, film forming polymers with crosslinkable groups can be used, for example, alkyds of linseed oil can be used along with the oxidative driers such as zirconium or cobalt salt of C-8 to C-10 carboxylic acid.

In other embodiments, the solvent borne coating composition can comprise a crosslinkable component and a crosslinking component. Typical crosslinkable components can be film-forming polymers. Suitable film-forming polymers can include, for example, polyacrylates, polyacrylourethanes, polyester urethanes, polyethers, polyesters or a combination thereof. The crosslinking components can include, for example, polyisocyanates, blocked isocyanates, alkylated melamines, epoxy resins or a combination thereof. One of ordinary skill in the art would be able to chose the correct amounts and combinations of crosslinkable and crosslinking components to produce the desired coating composition.

It can be desirable to add other ingredients to the coating composition such as antioxidants, flow control agents, UV stabilizers, light quenchers and absorbers, and rheology control agents such as, for example, fumed silica and microgels.

A further embodiment of the present disclosure is an article comprising a substrate wherein the substrate is coated with a dried and cured layer of a coating composition wherein the coating composition comprises a pigment dispersion, wherein the pigment dispersion comprises a pigment dispersant, organic solvent, and one or more pigments, and wherein the pigment dispersant comprises the disclosed graft copolymer.

Suitable articles can include, for example, automobile bodies, any and all items manufactured and painted by automobile sub-suppliers, frame rails, commercial trucks and truck bodies, including but not limited to beverage bodies, utility bodies, ready mix concrete delivery vehicle bodies, waste hauling vehicle bodies, and fire and emergency vehicle bodies, as well as any potential attachments or components to such truck bodies, buses, farm and construction equipment, truck caps and covers, commercial trailers, consumer trailers, recreational vehicles, including but not limited to, motor homes, campers, conversion vans, vans, pleasure vehicles, pleasure craft snow mobiles, all terrain vehicles, personal watercraft, motorcycles, boats, and aircraft. The substrate can further include industrial and commercial new construction and maintenance thereof; cement and wood floors; leather; walls of commercial and residential structures, such office buildings and homes; amusement park equipment; concrete surfaces, such as parking lots and drive ways; asphalt and concrete road surface, wood substrates, marine surfaces; outdoor structures, such as bridges, towers; coil coating; railroad cars; printed circuit boards; machinery; OEM tools; signage; fiberglass structures; sporting goods; and sporting equipment.

The following examples illustrate the disclosed graft copolymer. All parts and percentages are on a weight basis unless otherwise indicated. All molecular weights are determined by gel permeation chromatography (GPC) using a polystyrene standard.

EXAMPLES

The following ingredients were used in the examples;
VAZO® 67 initiator is available from DuPont, Wilmington, Del.

Unless specifically stated otherwise, all ingredient are available from the Aldrich Chemical Company, Milwaukee, Wis.

Gardner-Holdt viscosity was determined by ASTM D1545-07.

Macromonomer A
Preparation of butyl methacrylate/methyl methacrylate macromonomer, 50/50 percent by weight.

This example illustrates the preparation of a macromonomer that can be used to form a graft copolymer of this disclosure. A 12-liter flask was equipped with a thermometer, stirrer, additional funnels, heating mantle, reflux condenser and a means of maintaining a nitrogen blanket over the reactants. The flask was held under nitrogen positive pressure and the following ingredients were employed. All amounts are given in grams.

| Portion 1 | |
|---|---|
| Methyl ethyl ketone | 1320 |
| Methyl methacrylate | 518.4 |
| Butyl methacrylate | 518.4 |
| Portion 2 | |
| diaquabis(borondifluorodiphenyl glyoximato) cobaltate (II), Co(DPG-BF$_2$) | 0.102 |
| Methyl ethyl ketone | 167.9 |
| Portion 3 | |
| VAZO ® 67 initiator | 8.49 |
| Methyl ethyl ketone | 110 |
| Portion 4 | |
| Methyl methacrylate | 2073.6 |
| Butyl methacrylate | 2073.6 |
| Portion 5 | |
| VAZO ® 67 initiator | 84.9 |
| Methyl ethyl ketone | 1100 |

Portion 1 mixture was charged to the flask and the mixture was heated to reflux temperature and refluxed for 20 minutes. Portion 2 solution was then added to the flask over a 5 minute period and the reaction mixture was refluxed for 10 minutes. Portion 3 was then added over 5 minutes while the reaction mixture was held at reflux temperature. Portion 4 and Portion 5 were then simultaneously fed to the reactor over 240 minutes while the reaction mixture was held at reflux temperature throughout the course of additions. Reflux was continued for another 2 hours and the solution was cooled to room temperature and filled out. The resulting macromonomer solution was a light yellow clear polymer solution and had a solid content of about 65.3 percent. The macromonomer had a $M_w$ of 5,617 and number average molecular weight ($M_n$) of 3,677.

Dispersant Example 1 (D1)

Preparation of a Graft Copolymer Having Imidazole Groups on the Backbone

This example shows the preparation of a graft copolymer of this disclosure containing imidazole groups and hydroxyl groups, specifically methyl acrylate-co-2-hydroxylethyl acrylate-co-N-vinyl imidazole-g-methyl methacrylate-co-butyl methacrylate, 12/8/8//36/36 percent by weight.

A 2-liter flask was equipped as in Example 1. The flask was held under nitrogen positive pressure and the following ingredients were employed. All amounts are given in grams.

| Portion 1 | |
|---|---|
| Macromonomer A | 797.54 |
| Butyl acetate | 99.45 |
| Portion 2 | |
| N-vinyl imidazole | 57.6 |
| Methyl acrylate | 86.4 |
| 2-hydroxylethyl acrylate | 57.6 |
| Portion 3 | |
| VAZO ® 67 initiator | 9.52 |
| Butyl acetate | 170 |

-continued

| Portion 4 | |
|---|---|
| VAZO ® 67 initiator | 0.84 |
| Ethyl acetate | 15 |

| Portion 5 | |
|---|---|
| VAZO ® 67 initiator | 0.84 |
| Butyl acetate | 15 |

| Portion 6 | |
|---|---|
| Butyl acetate | 20 |

| Portion 7 | |
|---|---|
| Butyl acetate | 16 |

Portion 1 was charged to the flask and the mixture was heated to reflux temperature and refluxed for 10 minutes. Portion 2 and Portion 3 were added simultaneously over 3 hours. The reaction mixture was held at reflux temperature throughout the addition. The mixture was refluxed for another 30 minutes and Portion 4 was added over 5 minutes. It was refluxed for another 30 minutes and Portion 5 was added over 5 minutes. Portion 6 and Portion 7 were used as rinses for the monomer container and the container for the initiator solution respectively. The reaction mixture was held at reflux for another 1.5 hours. After cooling the polymer solution was filled out to yield a 54.0 percent polymer solution with a Gardner-Holdt viscosity of W. The graft copolymer had a $M_w$ of 24,085 and a $M_n$ of 5,550.

Dispersant Example 2 (D2)

Preparation of a Graft Copolymer Having Imidazole and Amide Groups on the Backbone This example shows the preparation of a graft copolymer of this disclosure containing imidazole groups, cyclic amide groups, and hydroxyl groups, specifically N-vinyl-2-pyrrolidone-co-N-vinyl imidazole-co-methyl acrylate-co-2-hydroxylethyl acrylate-g-methyl methacrylate-co-butyl methacrylate, 6/4/8/8//37/37 percent by weight.

A 5-liter flask was equipped as in Example 1. The flask was held under nitrogen positive pressure and the following ingredients were employed.

| Portion 1 | |
|---|---|
| Macromonomer A | 2049.23 |
| Butyl acetate | 229.25 |

| Portion 2 | |
|---|---|
| N-vinyl-2-pyrrolidone | 108.0 |
| N-vinyl imidazole | 144.0 |
| Methyl acrylate | 72.0 |
| 2-hydroxylethyl acrylate | 144.0 |

| Portion 3 | |
|---|---|
| VAZO ® 67 initiator | 23.8 |
| Butyl acetate | 425 |

| Portion 4 | |
|---|---|
| VAZO ® 67 initiator | 2.1 |
| Ethyl acetate | 37.5 |

| Portion 5 | |
|---|---|
| VAZO ® 67 initiator | 2.1 |
| Butyl acetate | 37.5 |

| Portion 6 | |
|---|---|
| Butyl acetate | 50 |

| Portion 7 | |
|---|---|
| Butyl acetate | 40 |

The graft copolymer was prepared using the procedure described in Dispersant Example 1. After cooling the polymer solution was filled out to yield a 53.0 percent polymer solution with a Gardner-Holdt viscosity of W. The graft copolymer had a $M_w$ of 23,180 and $M_n$ of 5,691.

Dispersant Example 3 (D3)

Preparation of a Graft Copolymer Having Imidazole, and Quaternary Ammonium Groups on the Backbone This example shows the preparation of a graft copolymer of this disclosure containing imidazole and quaternary ammonium groups, specifically methyl acrylate-co-2-hydroxylethyl acrylate-co-N-vinyl imidazole(methyl p-toluensulfonate)-g-methyl methacrylate-co-butyl methacrylate, 11.33/7.55/7.55(5.60)//33.98/33.98 percent by weight.

A 1-liter flask was equipped as in Dispersant Example 1. The flask was held under nitrogen positive pressure and the following ingredients were employed.

| Portion 1 | |
|---|---|
| Example D1 | 400.0 |
| Methyl p-toluenesulfonate | 12.82 |
| Butyl acetate | 14.88 |

Portion 1 was charged to the flask and the mixture was heated to reflux temperature and refluxed for 30 minutes. After cooling the polymer solution was filled out to yield a 55.03 percent polymer solution with a Gardner-Holdt viscosity of Y+3/4.

Dispersant Example 4 (D4)

Preparation of a Graft Copolymer Having Imidazole Groups on the Backbone

The upper limit of macromonomer was used in making this graft copolymer.

This example shows the preparation of a graft copolymer containing imidazole groups, specifically methyl acrylate-co-N-vinyl imidazole-g-methyl methacrylate-co-butyl methacrylate, 7/8//42.5/42.5 percent by weight.

A 2-liter flask was equipped as in Example 1. The flask was held under nitrogen positive pressure and the following ingredients were employed.

| Portion 1 | |
|---|---|
| Macromonomer A | 941.54 |
| Butyl acetate | 49.05 |

| Portion 2 | |
|---|---|
| N-vinyl imidazole | 57.6 |
| Methyl acrylate | 50.4 |

-continued

| Portion 3 | | |
|---|---|---|
| VAZO ® 67 initiator | 9.52 | |
| Butyl acetate | 170 | |
| Portion 4 | | |
| VAZO ® 67 initiator | 0.84 | |
| Ethyl acetate | 15 | |
| Portion 5 | | |
| VAZO ® 67 initiator | 0.84 | |
| Butyl acetate | 15 | |
| Portion 6 | | |
| Butyl acetate | 20 | |
| Portion 7 | | |
| Butyl acetate | 16 | |

The graft copolymer was prepared using the procedure described in Dispersant Example 1. After cooling the polymer solution was filled out to yield a 54.2 percent polymer solution with a Gardner-Holdt viscosity of L+1/4. The graft copolymer had a $M_w$ 10,782 and a $M_n$ 3886.

Comparative Example 1 (C1)

Preparation of a Graft Copolymer Having No Imidazole Groups or Amide Groups on the Backbone This example shows the preparation of a graft copolymer containing non-functional and hydroxyl groups, specifically methyl acrylate-co-2-hydroxylethyl acrylate-g-methyl methacrylate-co-butyl methacrylate, 22/8//35/35 percent by weight.

A 2-liter flask was equipped as in Dispersant Example 1. The flask was held under nitrogen positive pressure and the following ingredients were employed.

| Portion 1 | | |
|---|---|---|
| Macromonomer A | 775.38 | |
| Butyl acetate | 94.74 | |
| Portion 2 | | |
| Methyl acrylate | 158.4 | |
| 2-hydroxylethyl acrylate | 57.6 | |
| Portion 3 | | |
| VAZO ® 67 initiator | 9.52 | |
| Butyl acetate | 170 | |
| Portion 4 | | |
| VAZO ® 67 initiator | 0.84 | |
| Ethyl acetate | 15 | |
| Portion 5 | | |
| VAZO ® 67 initiator | 0.84 | |
| butyl acetate | 15 | |
| Portion 6 | | |
| Butyl acetate | 20 | |
| Portion 7 | | |
| Butyl acetate | 16 | |

Portion 1 was charged to the flask and the mixture was heated to reflux temperature and refluxed for 10 minutes. Portion 2 and Portion 3 were added simultaneously over 3 hours. The reaction mixture was held at reflux temperature throughout the course. The mixture was refluxed for another 30 minutes and Portion 4 was added over 5 minutes. It was refluxed for another 30 minutes and Portion 5 was added over 5 minutes. Portion 6 and Portion 7 were used as rinses for the monomer container and the container for the initiator solution respectively. The reaction mixture was held at reflux for another 1.5 hours. After cooling the polymer solution was filled out to yield a 55.0 percent polymer solution with a Gardner-Holdt viscosity of L. The graft copolymer had a $M_w$ 19,528 and a $M_n$ 6,952.

Comparative Example 2 (C2)

Preparation of a Graft Copolymer Having Amide and Hydroxyl Groups, but No Imidazole Groups on the Backbone This example shows the preparation of a graft copolymer containing amide and hydroxyl groups, specifically methyl N-vinyl-2-pyrrolidone-co-acrylate-co-2-hydroxylethyl acrylate-g-methyl methacrylate-co-butyl methacrylate, 10/10/8//36/36 percent by weight.

A 2-liter flask was equipped as in Dispersant Example 1. The flask was held under nitrogen positive pressure and the following ingredients were employed.

| Portion 1 | | |
|---|---|---|
| Macromonomer A | 797.54 | |
| Butyl acetate | 99.45 | |
| Portion 2 | | |
| N-vinyl-2-pyrrolidone | 72.0 | |
| Methyl acrylate | 72.0 | |
| 2-hydroxylethyl acrylate | 57.6 | |
| Portion 3 | | |
| VAZO ® 67 initiator | 9.52 | |
| Butyl acetate | 170 | |
| Portion 4 | | |
| VAZO ® 67 initiator | 0.84 | |
| Ethyl acetate | 15 | |
| Portion 5 | | |
| VAZO ® 67 initiator | 0.84 | |
| Butyl acetate | 15 | |
| Portion 6 | | |
| Butyl acetate | 20 | |
| Portion 7 | | |
| Butyl acetate | 16 | |

The graft copolymer was prepared using the procedure described in Comparative Example 1. After cooling the polymer solution was filled out to yield a 55.0 percent polymer solution with a Gardner-Holdt viscosity of S. The graft copolymer had a $M_w$ 28,178 and a $M_n$ 7,803.

Comparative Example 3 (C3)

Preparation of a Graft Copolymer Having Hydroxyl and tertiary Amine Groups, but No Imidazole Groups on the Backbone This example shows the preparation of a graft copolymer containing hydroxyl and amine groups, specifically methyl acrylate-co-2-hydroxylethyl acrylate-co-N,N-dimethylaminoethyl acrylate-g-methyl methacrylate-co-butyl methacrylate, 18/8/8//33/33 percent by weight.

A 2-liter flask was equipped as in Dispersant Example 1. The flask was held under nitrogen positive pressure and the following ingredients were employed.

| Portion 1 | |
|---|---|
| Macromonomer A | 731.08 |
| Butyl acetate | 110.25 |
| Portion 2 | |
| N,N-dimethylaminoethyl acrylate | 57.6 |
| Methyl acrylate | 129.6 |
| 2-hydroxyethyl acrylate | 57.6 |
| Portion 3 | |
| VAZO ® 67 initiator | 9.52 |
| Butyl acetate | 170 |
| Portion 4 | |
| VAZO ® 67 initiator | 0.84 |
| Ethyl acetate | 15 |
| Portion 5 | |
| VAZO ® 67 initiator | 0.84 |
| Butyl acetate | 15 |
| Portion 6 | |
| Butyl acetate | 20 |
| Portion 7 | |
| Butyl acetate | 16 |

The graft copolymer was prepared using the procedure described in Comparative Example 1. After cooling the polymer solution was filled out to yield a 54.0 percent polymer solution with a Gardner-Holdt viscosity of O+1/2. The graft copolymer had a $M_w$ 18,122 and a $M_n$ 4760.

Comparative Example 4 (C4)

Preparation of a Graft Copolymer Having imidazole Groups on the backbone

However, a lower amount of macromonomer than what is specified in this invention is used in making the graft copolymer.

This example shows the preparation of a graft copolymer containing imidazole and hydroxyl groups, specifically methyl acrylate-co-2-hydroxyethyl acrylate-co-N-vinyl imidazole-g-methyl methacrylate-co-butyl methacrylate, 30/8/8//27/27 percent by weight.

A 2-liter flask was equipped as in Example 1. The flask was held under nitrogen positive pressure and the following ingredients were employed.

| Portion 1 | |
|---|---|
| Macromonomer A | 598.15 |
| Butyl acetate | 169.24 |
| Portion 2 | |
| N-vinyl imidazole | 57.6 |
| Methyl acrylate | 216.0 |
| 2-hydroxyethyl acrylate | 57.6 |
| Portion 3 | |
| VAZO ® 67 initiator | 9.52 |
| Butyl acetate | 170 |
| Portion 4 | |
| VAZO ® 67 initiator | 0.84 |
| Ethyl acetate | 15 |

-continued

| Portion 5 | |
|---|---|
| VAZO ® 67 initiator | 0.84 |
| Butyl acetate | 15 |
| Portion 6 | |
| Butyl acetate | 20 |
| Portion 7 | |
| Butyl acetate | 16 |

The graft copolymer was prepared using the procedure described in Comparative Example 1. After cooling the polymer solution was filled out to yield a 57.0 percent polymer solution with a Gardner-Holdt viscosity of Z2. The graft copolymer had a $M_w$ 35,934 and a $M_n$ 6286. The polymer solution became very cloudy upon storage.

Comparative Example 5 (C5)

Preparation of a Graft Copolymer Having Imidazole Groups on the Backbone

An even lower amount of macromonomer than what was used in Comparative Example 4 (C4).

This example shows the preparation of a graft copolymer containing imidazole and hydroxyl groups, specifically methyl acrylate-co-2-hydroxyethyl acrylate-co-N-vinyl imidazole-g-methyl methacrylate-co-butyl methacrylate, 44/8/8//20/20 percent by weight.

A 2-liter flask was equipped as in Example 1. The flask was held under nitrogen positive pressure and the following ingredients were employed.

| Portion 1 | |
|---|---|
| Macromonomer A | 443.08 |
| Butyl acetate | 223.51 |
| Portion 2 | |
| N-vinyl imidazole | 57.6 |
| Methyl acrylate | 316.8 |
| 2-hydroxyethyl acrylate | 57.6 |
| Portion 3 | |
| VAZO ® 67 initiator | 9.52 |
| Butyl acetate | 170 |
| Portion 4 | |
| VAZO ® 67 initiator | 0.84 |
| Ethyl acetate | 15 |
| Portion 5 | |
| VAZO ® 67 initiator | 0.84 |
| Butyl acetate | 15 |
| Portion 6 | |
| Butyl acetate | 20 |
| Portion 7 | |
| Butyl acetate | 16 |

The graft copolymer was prepared using the procedure described in Comparative Example 1. After cooling the polymer solution was filled out to yield a 55.7 percent polymer solution with a Gardner-Holdt viscosity of Z1+1/2. The graft copolymer had a $M_w$ 33,668 and a $M_n$ 6536. The polymer solution became very cloudy and a significant amount of polymer precipitated out of the solution.

Example 5

Evaluation of Dispersant Properties

The dispersant effectiveness was determined by sand-grinding a mixture of pigment, solvent, and dispersant, and observing the dispersion quality under an Olympus microscope, 40×. The well dispersed system would have a uniform appearance and the pigment particles would show vigorous Brownian motion. In contrast, the flocculated systems would have islands of flocculated pigment particles interspersed with areas of relatively clear solvent.

The dispersion samples were prepared by the following procedure. To a 2 oz. glass bottle, 15 grams of sand, 20 grams of butyl acetate, 2 grams of pigment and 1 gram of the graft copolymer dispersant solution were added. The bottle was sealed and agitated on a RED DEVIL® paint shaker for 15 minutes.

The pigments used were as follows:
1. IRGAZIN® GLT
2. IRGAZIN® yellow 3RLTN
3. HELIOGEN® green L 9361
4. HELIOGEN® green L 8605
5. RAVEN® 5000 carbon black
6. IRGAZIN® yellow 2RLT
7. CINQUASIA® Scarlet RT-390-D
8. HOSTAPERM® brown HFR-01
9. HOSTAPERM® violet RL-NF
10. HOSTAPERM® blue BT-729-D
11. IRGAZIN® blue A3R
12. SICOTRANS® Red L 2817

IRGAZIN® and CINQUASIA® pigments are available from the Ciba Specialty Chemicals, Tarrytown, N.Y.

HELIOGEN® and SICOTRANS® pigments are available from the BASF Corporation, Florham Park, N.J.

RAVEN® pigments are available from Columbian Chemicals, Marietta, Ga.

HOASTAPERM® pigments are available from Clariant Corporation, Charlotte, N.C.

Results

| Pigment | D1 | D2 | D3 | C1 | C2 | C3 |
|---|---|---|---|---|---|---|
| 1 | D | D | D | F | F | F |
| 2 | D | D | D | F | D | D |
| 3 | D | D | D | D | D | D |
| 4 | D | D | D | F | D | D |
| 5 | D | D | D | F | D | D |
| 6 | D | D | D | F | D | F |
| 7 | D | D | D | F | D | D |
| 8 | D | D | D | F | D | F |
| 9 | SF | SF | D | F | F | F |
| 10 | D | D | D | D | D | F |
| 11 | F | F | D | F | F | F |
| 12 | D | D | D | D | D | D |

D: Deflocculated or dispersed
SF: Slightly flocculated
F: Flocculated

Based on these test results, the Dispersant Examples 1 and 2 having the imidazole groups on the backbone and Dispersant Example 3 having both the imidazole groups and quaternary ammonium groups showed improved performance over the Comparative Example 1 where no specific pigment anchoring groups were placed on the graft copolymer. Comparative Example 2 containing pyrrolidone groups on the backbone and Comparative Example 3, containing aliphatic tertiary groups on the backbone as the pigment anchoring group, showed improved dispersion properties over Comparative Example 1, but are less capable in dispersing a broad range of pigments when compared to Dispersant Examples 1, 2 and 3.

Example 6

Evaluation of Dispersant Properties

The dispersions of Example 5 were further challenged by adding 1 gm of methanol to each sample and mixing it well into the dispersion. The resulting dispersions were evaluated as in Example 5.

Results

| Pigment | D1 | D2 | D3 | C1 | C2 | C3 |
|---|---|---|---|---|---|---|
| 1 | D | D | D | F | F | F |
| 2 | SF | D | D | F | D | F |
| 3 | D | D | D | D | D | D |
| 4 | D | D | F | F | D | F |
| 5 | D | D | D | F | D | D |
| 6 | F | F | F | F | F | F |
| 7 | D | D | D | F | D | F |
| 8 | F | SF | F | F | F | F |
| 9 | F | F | F | F | F | F |
| 10 | D | D | D | F | F | F |
| 11 | F | F | F | F | F | F |
| 12 | D | D | D | D | D | D |

D: Deflocculated or dispersed
SF: Slightly flocculated
F: Flocculated

The difference between the Comparative Examples and the graft copolymers of this disclosure are even more pronounced in this test.

Example 7

Evaluation of Dispersant Properties

Dispersion Formula

| Ingredient (grams) | E7-A | Comparative E7-B | Comparative E7-C | E7-D |
|---|---|---|---|---|
| Butyl acetate | 140.0 | 144.0 | 142.3 | 140.3 |
| Dispersant Example 1 (D1) | 76.7 | | | |
| Comparative Example 4 (C4) | | 72.7 | | |
| Comparative Example 5 (C5) | | | 74.4 | |
| Dispersant Example 4 (D4) | | | | 76.4 |
| Acrylic resin[1] | 105.3 | 105.3 | 105.3 | 105.3 |
| Pigment[2] | 138.0 | 138.0 | 138.0 | 138.0 |
| Total | 460.0 | 460.0 | 460.0 | 460.0 |
| Pigment wt % | 30 | 30 | 30 | 30 |
| Solids % | 54.0 | 54.0 | 54.0 | 54.0 |

[1] A random acrylic resin prepared by the standard free radical polymerization method, having the composition of styrene/isobornyl methacrylate/2-ethylhexyl acrylate/2-hydroxyethyl methacrylate/butyl methacrylate/methyl methacrylate (10/10/15/30/10/25% by weight) at 65.5% solids in butyl acetate.
[2] SICOTRANS ® Red L 2817 from the BASF Corporation, Florham Park, New Jersey.

Butyl acetate, the dispersant example and the acrylic resin was added to a Model 01 attritor, available from Union Process, Akron, Ohio and mixed well. The pigment was slowly added and the mixture was mixed for another 5 minutes. The grinding media, 1816 grams of ⅛" steel shot, was added and the mixture was milled at 350 rpm for 12 hours. The content was filtered through a screen to separate the media, and the dispersions were collected in metal cans.

The viscosities (in centipoise, cps) of these dispersions were measured in a Brookfield viscometer at room temperature. The samples were then placed in an oven at 48.9° C. for a week, and their viscosities measured again afterwards. This was an accelerated stability test for the dispersions. The results are shown in table below.

|  | E7-A | Comparative E7-B | Comparative E7-C | E7-D |
|---|---|---|---|---|
| Solids % | 54.3 | 56.7 | 57.0 | 55.2 |
| Initial | | Viscosity (cps) | | |
| V01 | 500 | 54,000 | gelled | 200 |
| V20 | 270 | 8,850 | | 70 |
| V50 | 244 | 5,180 | | 80 |
| After 1 week in oven at 48.9° C. | | Viscosity (cps) | | |
| V01 | 8,900 | gelled | gelled | 200 |
| V20 | 2,555 | | | 75 |
| V50 | 1,668 | | | 84 |

V01, V20, V50: viscosity measured at 1 rpm, 20 rpm, and 50 rpm respectively using a #3 spindle.
The comparative examples, E7-B and E7-C, failed the tests based on the high viscosity and gellation. They were ineffective in dispersing or stabilizing this pigment. The example E7-A and E7-D produced good dispersion quality and acceptable viscosities for normal handling.

Example 8

Evaluation of Dispersant Properties

Dispersion Formula

| Ingredient (grams) | E8-A | Comparative E8-B | Comparative E8-C | E8-D |
|---|---|---|---|---|
| Butyl acetate | 104.7 | 107.7 | 106.4 | 105.0 |
| Dispersant Example 1 (D1) | 57.6 | | | |
| Comparative Example 4 (C4) | | 54.6 | | |
| Comparative Example 5 (C5) | | | 55.8 | |
| Dispersant Example 4 (D4) | | | | 57.3 |
| Acrylic resin[3] | 155.9 | 155.9 | 155.9 | 155.9 |
| Pigment[4] | 51.8 | 51.8 | 51.8 | 51.8 |
| Total | 370.0 | 370.0 | 370.0 | 370.0 |
| Pigment wt % | 14 | 14 | 14 | 14 |
| Solids % | 50.0 | 50.0 | 50.0 | 50.0 |

[3]A random acrylic resin prepared by the standard free radical polymerization method, having the composition of styrene/isobornyl methacrylate/2-ethylhexyl acrylate/2-hydroxyethyl methacrylate/butyl methacrylate/methyl methacrylate (10/10/15/30/10/25% by weight) at 65.5% solids in butyl acetate.
[4]CINQUASIA ® Scarlet RT-390-D from Ciba Specialty Chemicals, Tarrytown, New York.

Butyl acetate, the dispersant example and the acrylic resin was added to a Model 01 attritor, available from Union Process, Akron, Ohio and mixed well. The pigment was slowly added and the mixture was mixed for another 5 minutes. The grinding media, 1816 grams of 1/8" steel shot, was added, and the mixture was milled at 350 rpm for 12 hours. The content was filtered through a screen to separate the media, and the dispersions were collected in metal cans.

The viscosities (in centipoise, cps) of these dispersions were measured in a Brookfield viscometer at room temperature. The samples were then placed in an oven at 48.9° C. for a week, and their viscosities measured again afterwards. This was an accelerated stability test for the dispersions. The results are shown in table below.

|  | E8-A | Comparative E8-B | Comparative E8-C | E8-D |
|---|---|---|---|---|
| Solids % | 51.2 | 50.8 | 51.0 | 50.9 |
| Initial | | Viscosity (cps) | | |
| V01 | 11,000 | 14,000 | 24,000 | 20,000 |
| V20 | 4,450 | 4,350 | 4,250 | 4,850 |
| V50 | 2,680 | 2,740 | 2,380 | 2,940 |
| After 1 week in oven at 48.9° C. | | Viscosity (cps) | | |
| V01 | 5,000 | 23,600 | 6,000 | 26,000 |
| V20 | 3,300 | 9,850 | 2,300 | 8,150 |
| V50 | 2,760 | 6,480 | 1,960 | 5,840 |

V01, V20, V50: viscosity measured at 1 rpm, 20 rpm, and 50 rpm respectively using a #6 spindle.
The examples, E8-B, E8-C and E8-D, became very viscous and thixotropic after the oven test. While one embodiment of the disclosed pigment dispersant, E8-D, underperformed with this pigment, another embodiment, E8-A produced good dispersion quality and acceptable viscosities for normal handling.

The invention claimed is:
1. A pigment dispersant comprising a graft copolymer having a polymeric backbone and side chains attached to the backbone, wherein the graft copolymer is formed from a monomer mixture comprising;
 a) in the range of from 2 percent to 20 percent by weight of vinyl imidazole monomer, wherein the vinyl imidazole monomer forms the backbone of the graft copolymer; and
 b) in the range of from 55 percent to 85 percent by weight of a macromonomer, wherein the macromonomer forms the side chains of the graft copolymer; and
wherein the monomer mixture comprises less than 0.5 percent of acid functional monomers by weight based on the total weight of all of the monomers of the graft copolymer, wherein the macromonomer comprises polymerized ethylenically unsaturated monomers, and the percentages by weight are based on the total weight of the graft copolymer.
2. The pigment dispersant of claim 1 wherein the monomer mixture further comprises monomers free from functional groups.
3. The pigment dispersant of claim 1 wherein the monomer mixture further comprises ethylenically unsaturated monomers having functional groups wherein the functional groups are selected from the group consisting of acyclic amide, cyclic amide, amine, quaternary ammonium, hydroxyl and a combination thereof.
4. The pigment dispersant of claim 1 wherein the ethylenically unsaturated monomers of the macromonomer side chains have functional groups consisting of hydroxyl groups.
5. The pigment dispersant of claim 1 wherein the monomer mixture comprises in the range of from 2 percent to 15 percent of the vinyl imidazole and 60 percent to 80 percent by weight of the macromonomer, based on the total weight of the graft copolymer.
6. A coating composition comprising a film forming polymer and a pigment dispersion, wherein the pigment dispersion comprises a pigment dispersant, organic solvent and one or more pigments, wherein said pigment dispersant comprises a graft copolymer having a polymeric backbone and side chains attached to the backbone, and wherein the graft copolymer is formed from a monomer mixture comprising;
 a) in the range of from 2 percent to 20 percent by weight of vinyl imidazole monomer, wherein the vinyl imidazole monomer forms the backbone of the graft copolymer; and
 b) in the range of from 55 percent to 85 percent by weight of a macromonomer, wherein the macromonomer forms the side chains of the graft copolymer; and wherein the monomer mixture comprises less than 0.5 percent of acid functional monomers by weight based on the total weight of all of the monomers of the graft copolymer, wherein the macromonomer consists of polymerized ethylenically unsaturated monomers, and the percentages by weight are based on the total weight of the graft copolymer.

7. The coating composition of claim 6 wherein the film forming polymer comprises a crosslinkable component wherein the crosslinkable component is selected from the group consisting of polyacrylates, polyacrylourethanes, polyester urethanes, polyethers, polyester resins and a combination thereof.

8. The coating composition of claim 6 wherein the crosslinking component is selected from the group consisting of polyisocyanates, blocked isocyanates, alkylated melamines, epoxy resins and a combination thereof.

9. The coating composition of claim 6 wherein the pigment dispersant comprises in the range of from 2 percent to 15 percent of the vinyl imidazole and 60 percent to 80 percent by weight of the macromonomer, based on the total weight of the graft copolymer.

10. The coating composition of claim 6 wherein the monomer mixture further comprises additional ethylenically unsaturated monomers having functional groups wherein the functional groups are selected from the group consisting of acyclic amide, cyclic amide, amine, quaternary ammonium, hydroxyl and a combination thereof.

11. A pigment dispersion comprising pigment dispersant, organic solvent and one or more pigments wherein said pigment dispersant comprises a graft copolymer having a polymeric backbone and side chains attached to the backbone, wherein the graft copolymer is formed from a monomer mixture comprising;

a) in the range of from 2 percent to 20 percent by weight of vinyl imidazole monomer, wherein the vinyl imidazole monomer forms the backbone of the graft copolymer; and b) in the range of from 55 percent to 85 percent by weight of a macromonomer, wherein the macromonomer forms the side chains of the graft copolymer; and wherein the monomer mixture comprises less than 0.5 percent of acid functional monomers by weight based on the total weight of all of the monomers of the graft copolymer, wherein the macromonomer consists of polymerized ethylenically unsaturated monomers, and the percentages by weight are based on the total weight of the graft copolymer.

12. The pigment dispersion of claim 11, wherein said pigments are organic pigments.

13. The pigment dispersion of claim 11 wherein said pigments are inorganic pigments selected from the group consisting of titanium dioxide, iron oxides, zinc oxide, carbon black, talc, china clay, barytes, carbonates, silicates and a combination thereof.

14. The pigment dispersion of claim 11 wherein the monomer mixture comprises in the range of from 2 percent to 15 percent of the vinyl imidazole and 60 percent to 80 percent by weight of the macromonomer, based on the total weight of the graft copolymer.

15. The pigment dispersion of claim 11 wherein the monomer mixture further comprises additional ethylenically unsaturated monomers having functional groups wherein the functional groups are selected from the group consisting of acyclic amide, cyclic amide, amine, quaternary ammonium, hydroxyl and a combination thereof.

* * * * *